US006842660B2

United States Patent
Tripathi et al.

(10) Patent No.: US 6,842,660 B2
(45) Date of Patent: Jan. 11, 2005

(54) DEVICE AND METHOD FOR COMMUNICATING DATA IN A PROCESS CONTROL SYSTEM

(75) Inventors: Ashok R. Tripathi, Scottsdale, AZ (US); Muthukumar Ramalingam, Phoenix, AZ (US); David Rukstales, Phoenix, AZ (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 10/162,733

(22) Filed: Jun. 5, 2002

(65) Prior Publication Data

US 2003/0083754 A1 May 1, 2003

Related U.S. Application Data

(60) Provisional application No. 60/336,129, filed on Oct. 31, 2001.

(51) Int. Cl.[7] ............................................. G06F 19/00
(52) U.S. Cl. ......................... 700/121; 700/95; 700/117
(58) Field of Search ............................... 700/1, 51, 95, 700/117, 121

(56) References Cited

U.S. PATENT DOCUMENTS

| 5,790,410 A | 8/1998 | Warn et al. ............ 364/479.02 |
| 5,841,652 A | 11/1998 | Sanchez .................... 364/164 |
| 5,848,272 A | 12/1998 | Breggin et al. ............. 395/683 |
| 5,848,415 A | 12/1998 | Guck .......................... 707/10 |
| 6,121,593 A | 9/2000 | Mansbery et al. .......... 219/679 |
| 6,167,053 A | 12/2000 | Sato ........................... 370/410 |
| 6,263,255 B1 | 7/2001 | Tan et al. ................... 700/121 |
| 6,269,279 B1 | 7/2001 | Todate et al. .............. 700/121 |
| 6,298,454 B1 * | 10/2001 | Schleiss et al. .............. 714/37 |
| 6,401,059 B1 | 6/2002 | Shen et al. ................... 703/27 |
| 6,473,609 B1 | 10/2002 | Schwartz et al. ........... 455/406 |
| 6,629,002 B1 * | 9/2003 | Holder ......................... 700/96 |
| 6,711,731 B2 * | 3/2004 | Weiss .......................... 716/19 |
| 2002/0077711 A1 * | 6/2002 | Nixon et al. ................. 700/51 |
| 2003/0220768 A1 * | 11/2003 | Perry et al. ................. 702/188 |

OTHER PUBLICATIONS

US 6,170,004, 1/2001, McLaughlin et al. (withdrawn)

* cited by examiner

*Primary Examiner*—Anthony Knight
*Assistant Examiner*—Ronald D Hartman, Jr.
(74) *Attorney, Agent, or Firm*—Perman & Green, LLP; Richard Pickreign (57) ABSTRACT

A method for communicating process data between a plurality of devices in a process control system, including receiving process data in an equipment interface system data format from an equipment interface system, and selecting a set of the process data received from the equipment interface system for communication to a process data control system. The method also includes configuring the selected set of process data from the equipment interface system data format into an open format for communication to the process data control system, and transmitting the configured process data to the process data control system.

21 Claims, 8 Drawing Sheets

DEVICE AND METHOD FOR COMMUNICATING DATA IN A PROCESS CONTROL SYSTEM

CROSS-REFERENCE TO RELATED APPLICATIONS

This application claims priority of U.S. provisional patent application Ser. No. 60/336,129 filed on Oct. 31, 2001.

BACKGROUND OF THE INVENTION

1. Field of the Invention

The present invention relates to process control systems and, more particularly to a system and method for communicating between process control systems and semiconductor fabrication and manufacturing tools.

2. Brief Description of Related Developments

Traditionally, methods of gathering process data from manufacturing tools involve tapping signal lines between the tool and the tool controller, such as an equipment interface program, by multiplexing the industry standard SECS data interface between the tool controller and the tool. This multiplexing and tapping could affect the quality of the process data and interfere with the communication between the tool and tool controller.

While this tapping method worked to some degree with the standard 200 mm wafer fabrication, as the wafers being processed become larger and more expensive, faster and more accurate collecting of process data is now required which does not interfere with the transmission of the process data or inhibit automation activities. Furthermore, the data collection services must still facilitate the feedback of faults and process adjustments to the equipment interface system and the manufacturing tool.

Moreover, adding high speed data collection to process manufacturing tools has been a complex and disruptive procedure because of the limitations of the industry communication standard protocols, SECS, SECS II and GEM. Also, most of the engineering data collection systems use multiple communication modules which create many technical challenges. In addition, the use of proprietary communication formats for communication between the manufacturing tool and the process controller has limited the choice of software for advanced process control customers.

It would be helpful to have a simplified method of interfacing between the manufacturing tool and the advanced process control system which provides engineering data collection capability for manufacturing tool process control data without interfering with the communications between the process tools and the equipment interface machine.

SUMMARY OF THE INVENTION

In one aspect, the present invention is directed to a method for communicating process data between a plurality of devices in a process control system. In one embodiment, the method includes the steps of receiving process data in an equipment interface system data format from an equipment interface system, and selecting a set of the process data received from the equipment interface system for communication to a process data control system. The method further includes the steps of configuring the selected set of process data from the equipment interface system data format into an open format for communication to the process data control system, and transmitting the configured process data to the process data control system.

In another aspect, the present invention is directed to a communication builder device for communicating process data between a plurality of devices in a process control system. In one embodiment, the device includes a communication manager adapted to format process data received from an equipment interface system into a format suitable for the communication builder, and a data explorer for selecting a predefined set of the communication builder data format process data for reporting to process data control system.

The communication manager is further adapted to configure the selected set of process data into an open data format for communication to the process data control system, and is adapted to transmit the configured process data to the process data control system. A data administrator provides monitoring and management of the communication manager.

In another aspect, the invention is directed to a computer program product comprising, in one embodiment, a computer usable medium having computer readable code means embodied therein for causing a computer to communicate process data between a plurality of devices in a process control system. The computer readable code means in the computer program product comprises computer readable program code means for causing a computer to receive process data in an equipment interface system data format from an equipment interface system.

The computer readable code means in the computer program product further comprises computer readable program code means for causing a computer to select a set of the process data received from the equipment interface system for communication to a process data control system. The computer readable code means in the computer program product further comprises computer readable program code means for causing a computer to configure the selected set of process data from the equipment interface system data format into an open format for communication to the process data control system, and for causing a computer to transmit the configured data to the process data control system.

In another aspect, the invention is directed to a semiconductor fabrication and manufacturing process control system comprising, in one embodiment, a process data control device adapted to provide process monitoring and process analysis of process data received from at least one manufacturing tool, and adapted to provide control instructions to the at least one manufacturing tool.

The semiconductor fabrication and manufacturing process control system further comprises an equipment interface device adapted to receive data from and provide control to the at least one associated manufacturing tool based on control instructions received from the process data control device, and a communication builder device adapted to interface between and facilitate a communication of information and data between the process control device and the equipment interface device. The communication builder device is adapted to receive process data in an equipment interface system data format from the equipment interface system, and select a set of the process data received from the equipment interface system for communication to the process data control system. The communication builder device is further adapted to configure the selected set of process data from the equipment interface system data format into an open format for communication to the process data control system, and transmit the configured process data to the process data control system.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(S)

Figure 1:
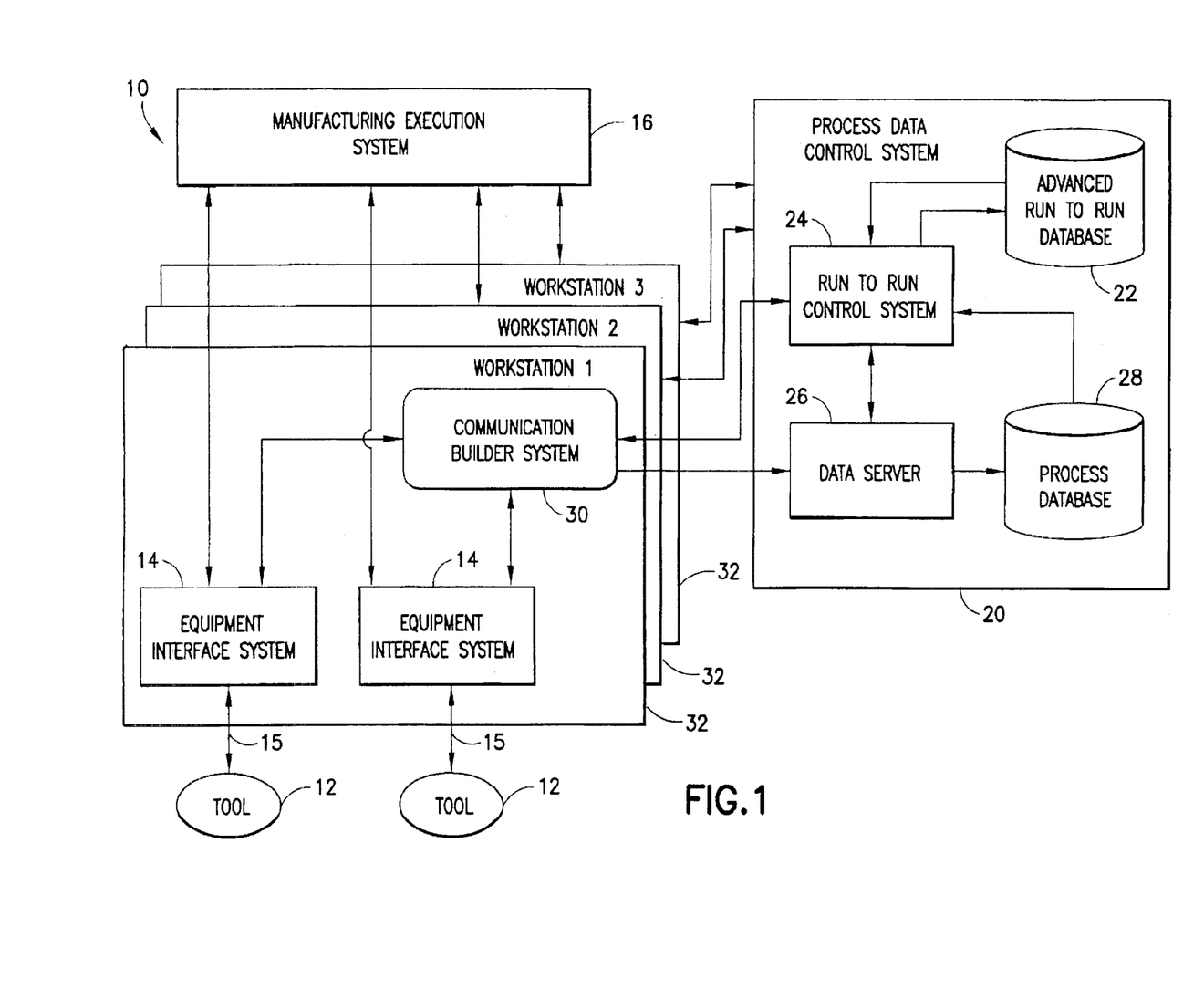
FIG. 1 is a block diagram of a process control system implementing one embodiment of a communication builder system incorporating features of the present invention.

Referring to FIG. 1, a block diagram of a system 10 incorporating features of the present invention is shown. Although the present invention will be described with reference to the embodiment shown in the drawings, it should be understood that the present invention can be embodied in many alternate forms.

As shown in FIG. 1, one embodiment of the system 10 in which the present invention can be used generally comprises a process control system adapted to control the process of manufacturing by providing computer control for manufacturing tools 12. The system 10 generally includes a communication builder system 30 for communicating process data and device control instructions between an equipment interface system 14 and a process data control system 20. In alternative embodiments, the system 10 can include such other suitable components for allowing equipment interface devices to communicate with process control systems. It is a feature of the present invention to provide a connectivity device that provides a communication link, such as the communication builder 30, between the equipment interface system (EI) 14 which is in communication with a manufacturing tool 12, and the process data control system 20, such as an advanced process control system 20.

The communication builder system 30 also provides a simplified method of interfacing between the manufacturing tool 12 and the equipment interface system 14 without interfering with the communications between the process tool and the equipment interface system. A manufacturing tool generally comprises a computer controlled machine for performing an operation, such as cutting or shaping, upon a workpiece. An equipment interface system 14 can communicate with one or more manufacturing tools 12.

Figure 2:
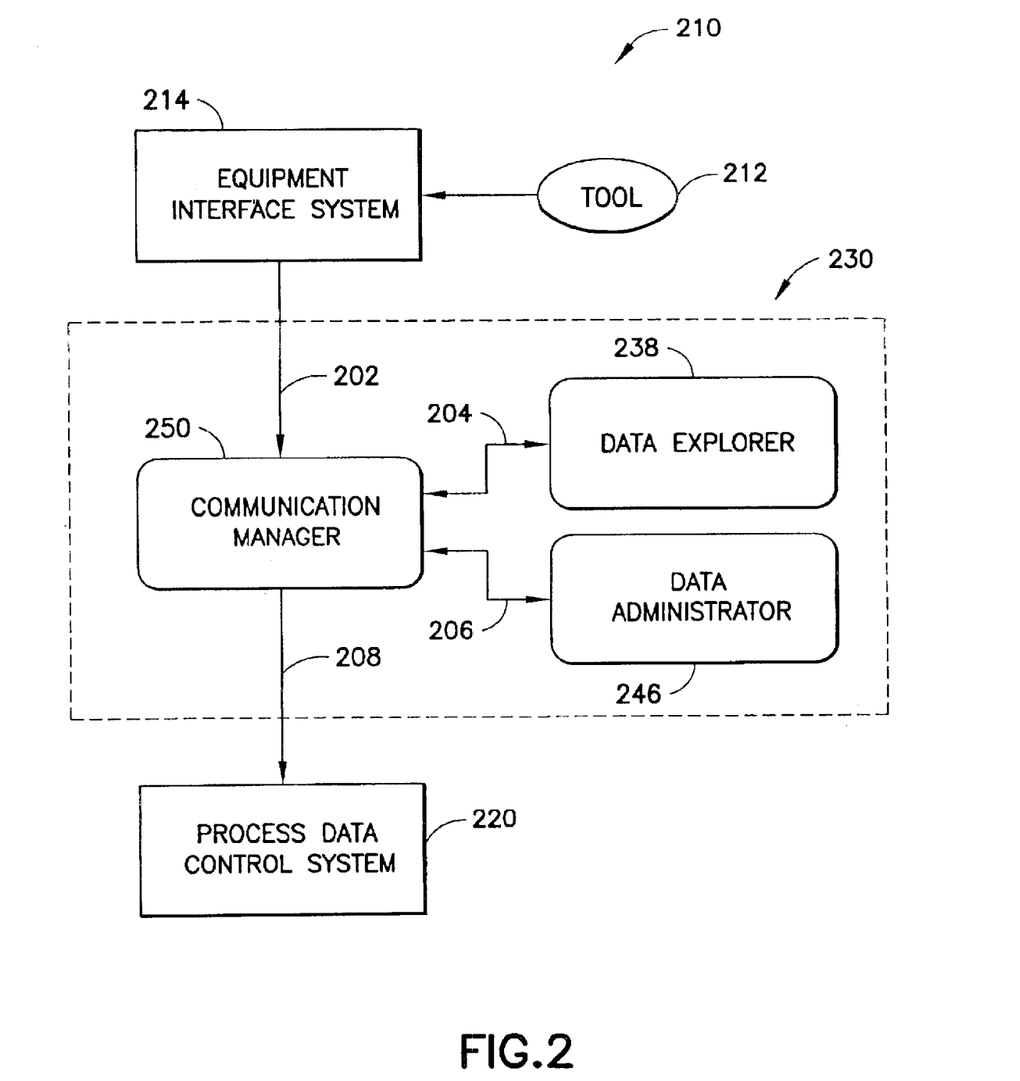
FIG. 2 is one embodiment of a dataflow diagram for processing data from an equipment interface system to a process data controller using a communication builder incorporating features of the present invention.

Referring to FIG. 2, one embodiment of a system 210 incorporating features of the present invention is shown in which the system 210 can comprise a semiconductor or electronics manufacturing system. The system 210 generally comprises a communication builder system 230 adapted to interface between an equipment interface system 214 and a process data control system 220. The communication builder system 230 is generally adapted to translate the process and control data between differing communication protocols and data formats, define sets of the process data, events and alarms received from the equipment interface system 214, and manage the communication and connection state of these systems.

The term "process data" as used herein generally refers to data generated by the manufacturing tool 212 describing the manufacturing tool's operation. Process data transmitted to the process data control system 220 can be used to reduce the time to implement advanced process control and track equipment productivity, leading to the early detection of process faults and the implementation of appropriate automatic or user assisted corrective actions.

The term "control data" as used herein generally refers to data sent to a manufacturing tool 212 or manufacturing tool controller 214, such as the equipment interface system 214, for altering the operation of the manufacturing tool 212.

The equipment interface system 214 shown in FIG. 2 is generally adapted to control and monitor in real time the processing of one or more manufacturing tools 212 such as those used for example, in semiconductor fabrication and manufacturing. The equipment interface system 214 generally controls the manufacturing tool 212 and communicates with the tool via a communications protocol, such as the semiconductor industry standard SEMI Equipment Communication Standard (SECS). SECS allows computer-controlled process equipment to communicate with various types of host computers using a standard consistent protocol. The association, Semiconductor Equipment and Materials International (SEMI), defines protocol standards such as SECS, SECS II and generic equipment model (GEM).

As shown in FIG. 2, in one embodiment the communication builder system 230 can comprise a data administrator 246, a data explorer 238, and a communication manager 250. The communication manager 250 generally coordinates the input, translation, and output services of the communication builder system 230, such as receiving process data 202 from the equipment interface system 214. The data administrator 246 provides management 206 of communication and connection state of the communication builder system 30, including monitoring of the operation of the communication manager 250. The data explorer 238 generally defines and selects a set of communication builder data variables from the process data 204 for storing in a configuration database and generating statistics and reporting.

Continuing with FIG. 2, the communication manager 250 is adapted to format the process data 202 into a format suitable for further use by the communication builder system 230. The communication manager 250 is also adapted to configure the set of process data 204 received from the data explorer 238 into an open architecture format, such as an extensible Markup Language (XML) format used by the advanced process control system 220. The communication manager 250 transmits the XML formatted process data 208 to the process data control system 220. In one embodiment, the formatted data 208 is transmitted via XML data over TCPIP sockets, although other data transmission methods, such as wireless transmission, can be used without departing from the broader aspects of the present invention. The data administrator 246 monitors and controls the communication manager 250, such as allowing starting and stopping of the communication manager 250.

The process data control system 220 shown in FIG. 2 is generally adapted to provide process monitoring and process analysis of the at least one manufacturing tool 212 being controlled by the equipment interface system 214. Generally, the process data control system 220 provides process monitoring and process analysis for a process control system 210 having multiple manufacturing tools 212. The process data control system 220 can be, for example, an advanced process control system including components for displaying of real time equipment status, for analysis of all lots processed by a manufacturing tool, for management of process recipes, and for statistical machine control.

Referring to FIG. 1, the process control system 10 can include one or more workstations 32. Each workstation 32 is generally adapted to host or include one or more equipment interface systems 14 and the communication builder system 30. In alternate embodiments, the workstation 32 can include any suitable components for process control of semiconductors or electronics manufacturing. The workstation 32 generally comprises a NT or Windows 2000 based workstation. However, in alternate embodiments, any suitable computing or processing platform can be used. Each workstation 32 and equipment interface system 14 can also be adapted to communicate with a manufacturing execution system 16 which controls the operation of each equipment interface system and each manufacturing tool 12, such as starting and stopping the operation of each manufacturing tool.

As shown in FIG. 1, the communication builder system 30 is coupled in any suitable fashion, such as cable, wireless or optical transmission, between the equipment interface system 14 and the process data control system 20. The communication builder system 30 collects data directly from the equipment interface system 14, and not from the communication signals 15 between the manufacturing tool 12 and the equipment interface system 12. The communications signals 15 generally can be in SECS II or GEM format. In this way, the communication builder system does not interfere with communication signals 15 between the manufacturing tool 12 and the equipment interface system 14.

Still referring to FIG. 1, in one embodiment the communication builder 30 can be embodied in a software system, such as an APCbuilder™ system 30 from Brooks Automation, Inc, but is not so limited, as the communication builder system may be embodied in software, hardware or firmware without departing from the broader aspects of the present invention. The communication builder system 30 and the equipment interface system 14 can be implemented in a Windows NT or Windows 2000 workstation 32 environment. However, the present invention is not so limited, as the communication builder system and the equipment interface system may be implemented on many types of hardware and software systems. While the communication builder 30 has been shown residing on the same computer as the equipment interface system 14, the communication builder 30 can be a stand alone device or located on a separate computer system.

Referring to FIG. 1, the process data control system 20 may be an advanced process control system such as Brooks-Sentinel™ Advanced Process Control products. The advanced process control system 20 is generally adapted to provide process monitoring and process analysis of process data received from at least one manufacturing tool 12, and adapted to provide control instructions in the form of control data to the at least one manufacturing tool 12. The advanced process control system 20 can include an advanced run to run database 22, a run to run control server 24, a data server 26 for receiving process data from the equipment interface system 14, and a process database 28 for storing the process data.

While a process data control system 20 for semiconductor manufacturing and fabrication has been shown and described, the process data control system 20 may include other components, such as a process recipe system, without departing from the present invention. The process data control system 20 may perform only monitoring and reporting functions and may not include run control components, without departing from the broader aspects of the present invention. While the process data control system 20 can be implemented on an Unix system, the present invention is not so limited, as the process data control system may be implemented on many types of hardware and software systems.

Figure 9:
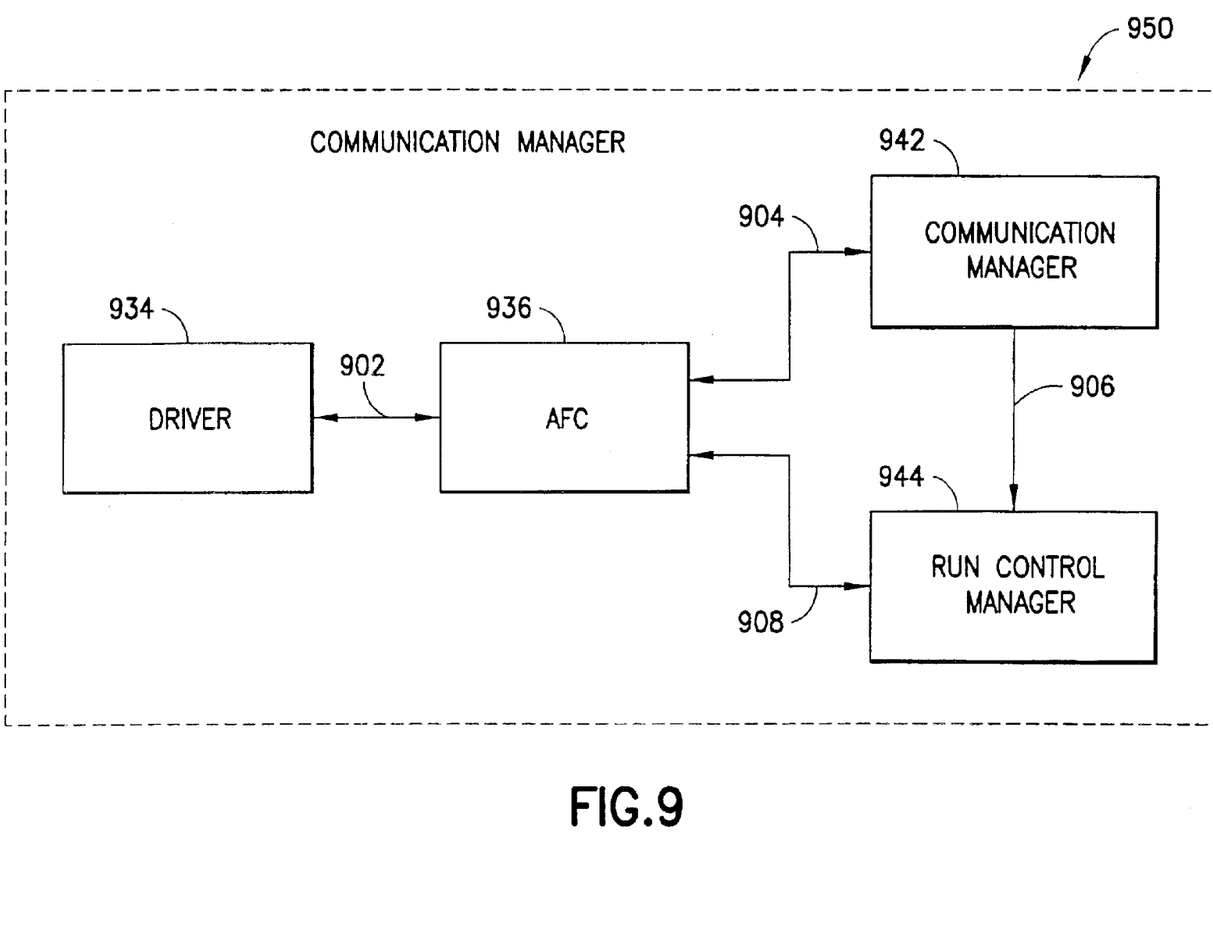
FIG. 9 is one embodiment of a dataflow diagram for communicating data to and from an equipment interface system using a communication builder system incorporating features of the present invention.

FIG. 9 shows an embodiment of a communication manager 950, including a dataflow of process data and control data through an embodiment of a communication manager 950. The communication manager 950 includes a communications driver module 934 for receiving process data in an equipment interface system data format from an equipment interface system (not shown), and for sending control data to the equipment interface system in an equipment interface system data format.

Continuing with FIG. 9, the communications driver module transfers process data 902 to an AFC module 936, and receives control data 902 from the AFC module 936. The AFC module 936 maps the process data from the communications driver data format associated with the particular communications driver 934 to predefined communications builder variables. The AFC module 936 also maps the control data from control data format into the communications driver data format associated with the particular communications driver 934. The AFC module 936 transfers the process data 904 to a communication handler 942 for configuration to an open data format for transmission to a process data control system (not shown).

The communication handler 936 in FIG. 9 transfers process control data 906 to a run control manager 944 for transfer to the process data control system (not shown). The run control manager 944 receives control data from the process data control system, configures the control data from an open data format, and transfers the control data 908 to the AFC module and communications driver module 934 for configuring into equipment interface system data format.

While a communication manager 950 including a communications driver module 934, AFC system 936, run control manager 944 and communication handler 942 has been shown and described, the present invention is not so limited, as the communication manager 950 includes functions which are grouped together for illustrative purposes, and other groupings of the same functions may be shown without departing from the broader aspects of the present invention.

Figure 3:
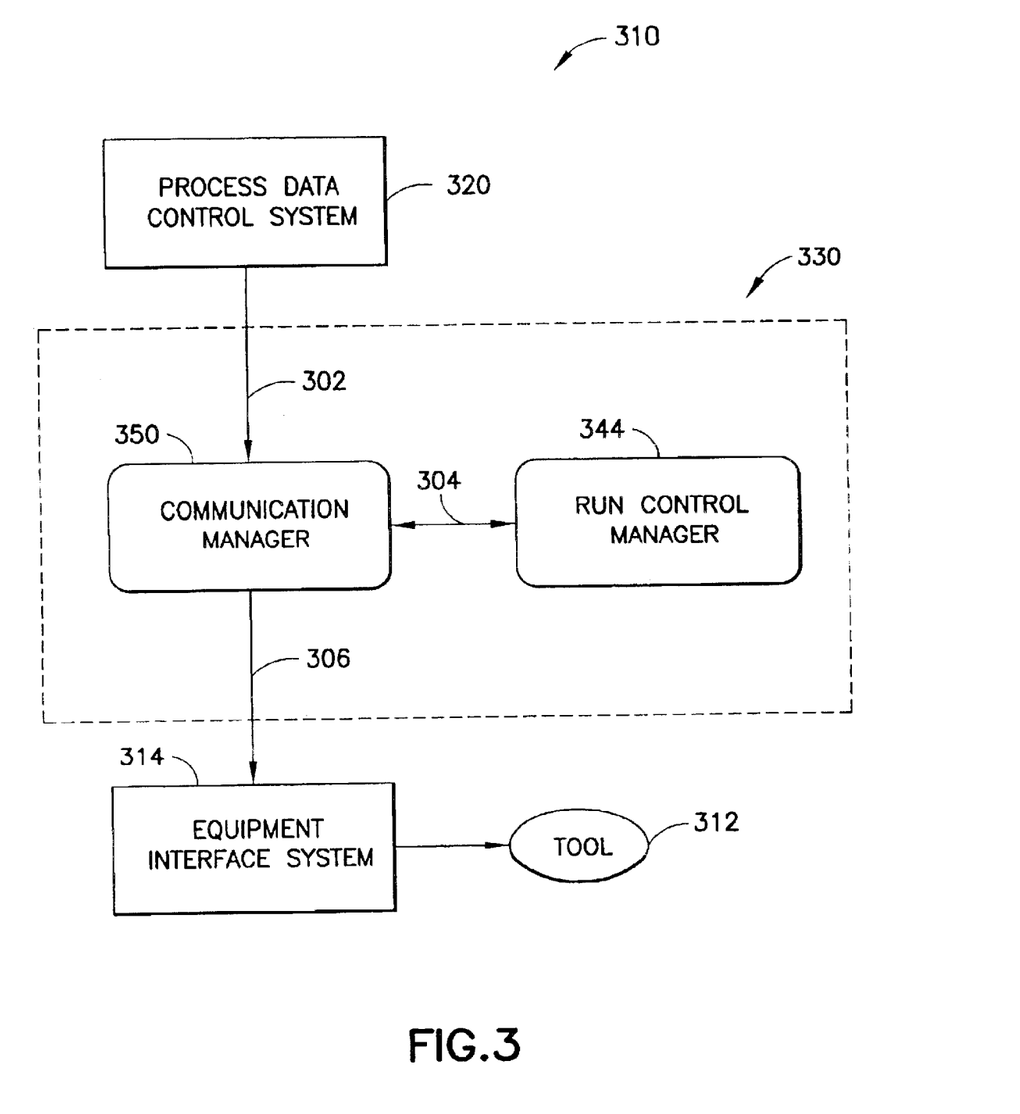
FIG. 3 is one embodiment of a dataflow diagram for processing data from a process data controller to an equipment interface system using a communication builder system incorporating features of the present invention.

FIG. 3 is one embodiment of control data flow through the communication builder system 330. Generally, the control data is used to modify the functioning of the manufacturing tool 312, such as adjusting the manufacturing tool to correct for an incorrect alteration of a workpiece caused by a previous manufacturing tool. As shown in FIG. 3, using a communication builder system 330 incorporating features of the present invention, control data 302 generated by the process data control system 320 is transferred to an equipment interface system 314.

Referring to FIG. 3, the control data 302 in XML data format is received from the advanced process control system 320 by elements of a communication manager 350, which transfers the control data 304 to a run control manager 344. The run control manager 344 is a messaging system which manages the interaction of the communication builder system 230 with the equipment interface system and the process data control system 320. The run control manager 344 is adapted to configure the run control data from XML format into a data format 304 used by the equipment interface system 314, such as SECS II or GEM data format. The run control manager 344 transfers the configured run control data 304 to the communication manager 350, which transmits 306 the configured run control data to the equipment interface system 314.

While an equipment interface system 320 has been shown and described, any suitable device for controlling a manufacturing tool 312 can be used to interface the manufacturing tool 312 with the communication builder 330, without departing from the broader aspects of the present invention.

Figure 4:
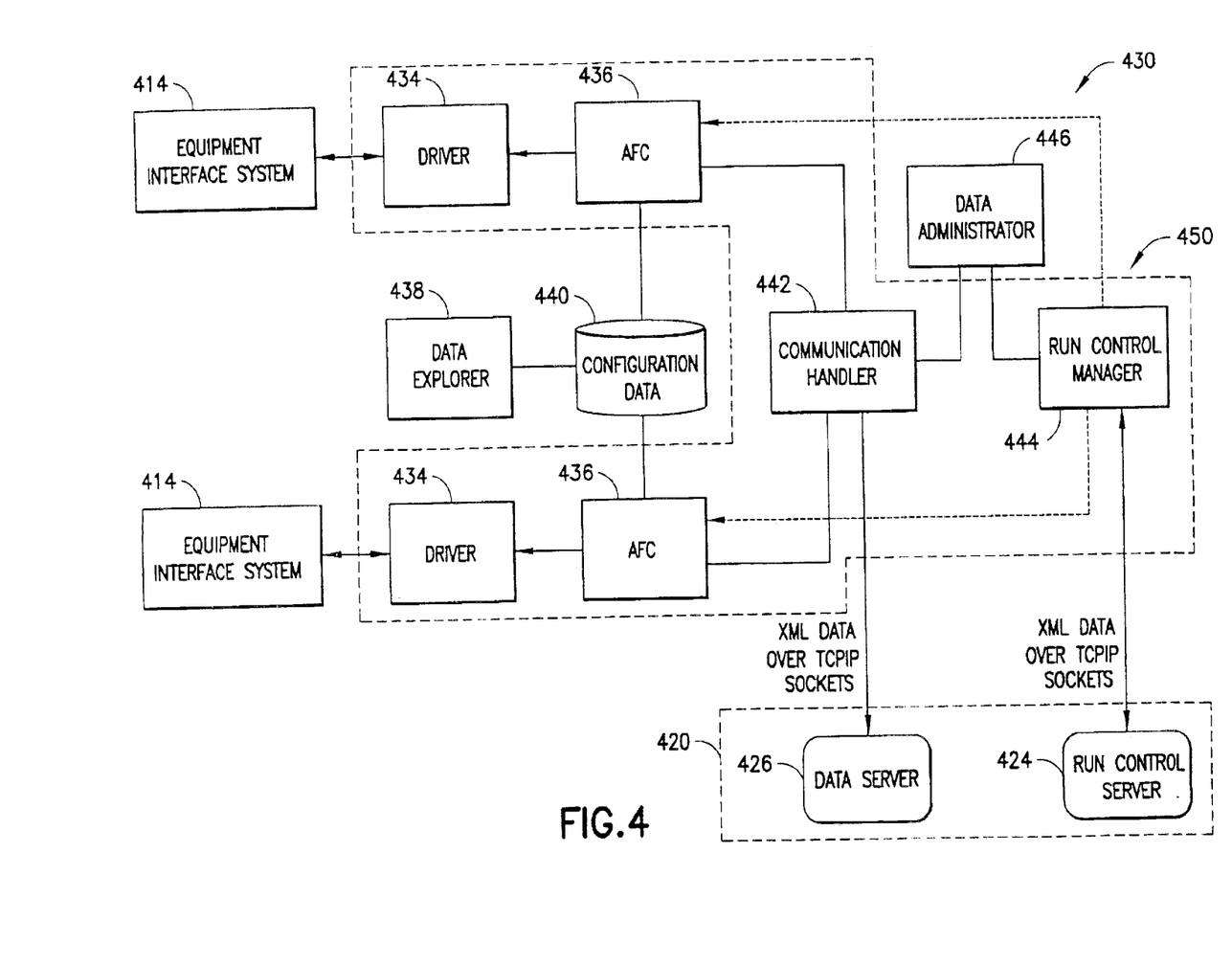
FIG. 4 is a schematic diagram of one embodiment of a communication builder system incorporating features of the present invention.

Referring to FIG. 4, another embodiment of a semiconductor fabrication and manufacturing process control system 410 incorporating features of the present invention is shown. The communication builder 430 includes at least one communications driver module 434 for communicating with each equipment interface system 414. The communications driver module 434 provides twoway functionality for translating data provided by the equipment interface system 414 to the communication builder 430 for mapping the SECS I, SECS II, or GEM manufacturing tool data variables to communication builder 430 variables.

Continuing with FIG. 4, there is at least one communications driver module 434, such as a FAbuilder™ 5.0 and 6.0, STATIONworks™, TOM™, SiViewMate™ or a generic driver module, for each type of communications protocol or data format used by each of the equipment interface systems 414 which interface with the communication builder 430. While two equipment interface systems 414 have been shown in communication with the communication builder system 430, the present invention is not so limited, as one or any number of equipment interface systems 414 may be in communication with the communication builder system 430, without departing from the broader aspects of the present invention.

As shown in FIG. 4, the communications driver module 434 is in communication with an implementation of an APC (Advanced Process Control) Foundation Class (AFC) module 436. The AFC module 436 provides the link between the communications driver module 434 and the rest of the communication builder communications system 430. The AFC module 436 provides a two-way communication functionality which allows the communication builder system 430 to map tool 12 variables defined for the equipment interface system 14 to variables and objects defined in the communication builder system 430. The AFC module 436 provides methods for the equipment interface system 14 to send process data to the communication manager 450. The AFC module 436 insulates the equipment interface system 14 developer from exposure to the full communication builder system 430 and direct dependency on technical details of the communications driver module 434, such as libraries. In other words, the equipment interface system 14 developer only has to know a small number of interface methods in order to make use of the functions of the communication builder system.

Therefore, developer of equipment interface system 14 will only need to understand the methods of AFC module 436 to functionally implement the communication builder 30, and will not need to know technical details of the operation of other modules of the communication builder system. While an AFC module for providing a link between the communications driver module 434 and the rest of the communication builder communications system 430 has been shown and described, the present invention is not so limited, as the AFC module may consist of several modules, classes and methods without departing from the broader aspects of the present invention.

Continuing with FIG. 4, the data explorer 438 maps the process data variables from the equipment interface system 414 to data variables of the communication builder 430. This user defined mapping is stored in a configuration database 440. The data explorer 438 also allows users to display and select the variables needed for process control. The process data available from the equipment interface system 414 to users through the data explorer 438 includes SECS status variables, SECS equipment constants, user variables, SECS Events, other integrated components such as sensor data and/or Standard Mechanical Interface (SMIF), and SECS Alarms. Other process data includes enum variables, bit variables, and chamber and schema variables.

The mapping of data variables from the equipment interface system 414 to the communication builder 430 by the data explorer 438 includes two presentation panels: a treeview panel which presents a hierarchical view of the data objects in the configuration, and a listview panel which displays properties of the data objects in the currently selected branch of the treeview panel. The user edits, deletes, or drags from the listview panel of properties to the treeview panel to build the configuration data. While mapping of data variables using two presentation panels has been described, the present invention is not so limited, as commonly used methods of presenting data to and manipulating data by users, such as selecting data items from a list and cutting and pasting the data into another list, may be used without departing from the broader aspects of the present invention.

Continuing to refer to FIG. 4, the communication builder 430 includes two messaging systems, the communication handler 442 and the run control manager 444. The communication handler 442 manages the receiving of process data from the equipment interface system 414, and configures the process data mapped and selected by the data explorer 438 from the equipment interface system data format to the XML format for communication to the data server 426 in the process data control system 420.

As shown in FIG. 4, the data administrator 446 provides management of the communications manager 450, including management of the communication handler 442 and the run control manager 444. For instance, the data administrator 446 controls connection states of the communication handler 442 and the run control manager 444, such as allowing the stopping and starting of the communication handler 442 and the run control manager 444. The data administrator also controls a session connection state of each equipment interface session, and coordinates the transmitting of control data in equipment interface system format to the equipment interface system 414.

Referring to FIG. 4, the run control manager 444 receives control data, such as fault data and process adjustment data, from the run control server 424 of the process data control system 420, and facilitates the feedback of process adjustments to the equipment interface system 414. The run control server 424 of the process data control system 420 evaluates the transmitted process data and provides run control services, such as the advanced run to run database 22 in the Brooks-Sentinel™ system 420. The fault data and process adjustment data sent to the equipment interface system 414 by the run control manager 444 can cause the equipment interface system 414 to alert an operator to suspend, or alter, the manufacturing tool 412 processing.

Referring to FIG. 4, the run control server 424 of the process data control system 420 also transmits physical measurements derived from metrology data through the run control manager 444 to the equipment interface system 414 so that feed back about the previous experience of the manufacturing tool 12 can automatically adjust a subsequent process step based on the results of a previous process step using, for example, a feed forward technique.

Figure 5:
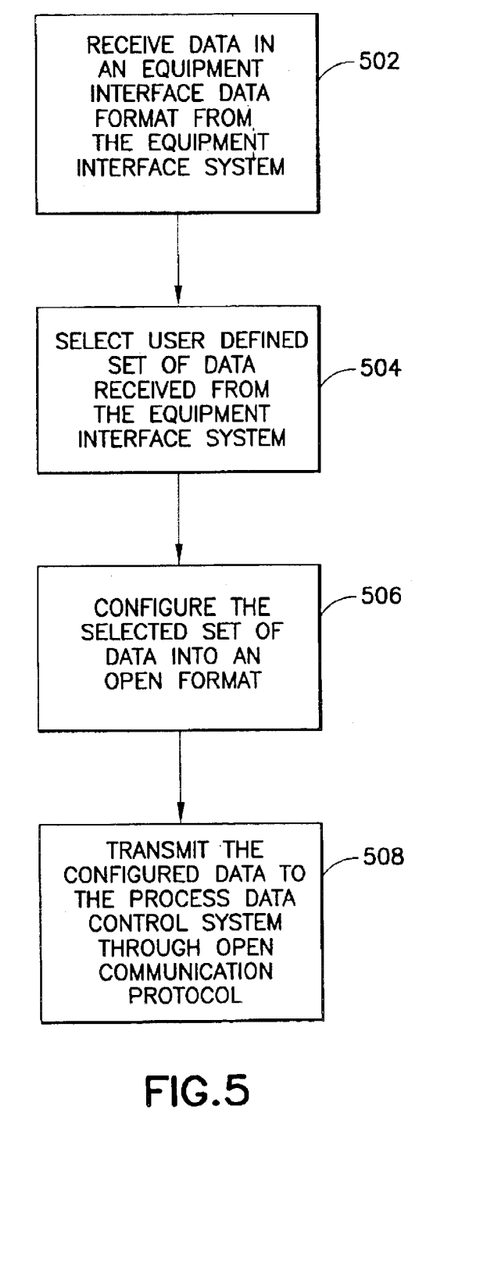
FIG. 5 is a flowchart of one embodiment of a method of the present invention illustrating the processing of data from an equipment interface system to a process data control system by a communication builder incorporating features of the present invention.

In operation, and referring to FIG. 5, process data is transferred from the equipment interface system 14 to the process data control system 20. In a step 502, the communication builder 30 receives data in an equipment interface system data format, such as for example SECS II or GEM, from the equipment interface system 14. In a step 504, the communication builder 30 selects at least one set of data received from the equipment interface system 14, where the, definition of the set of data was predefined by a communication builder system user, and in a step 505 maps the process data to predetermined variables for storage in a configuration database as discussed above, for example with respect to FIG. 4. The communication builder 30, as shown in step 506, configures the selected set of data into an open format, such as XML. The configured data is transmitted to the process data system 20, in a step 508.

Figure 6:
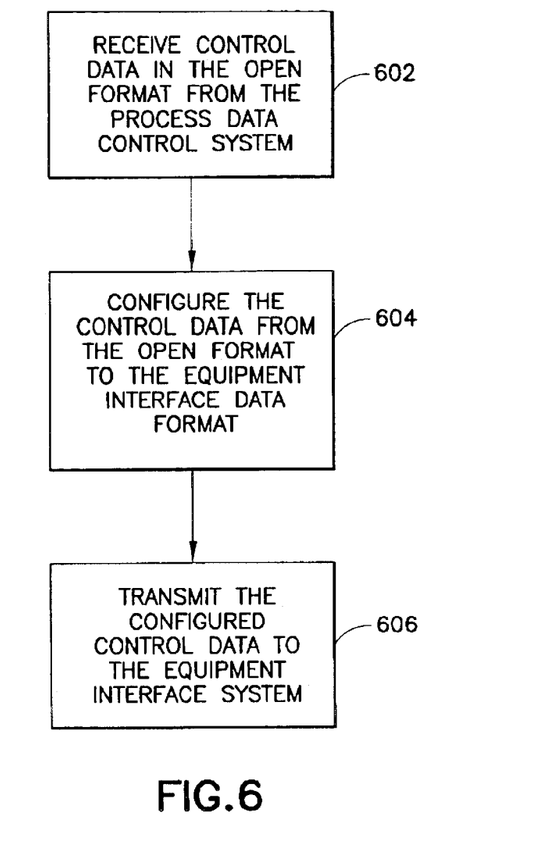
FIG. 6 is a flowchart of one embodiment of a method of the present invention illustrating the processing of data from a process data controller to an equipment interface system by a communication builder system incorporating features of the present invention.

Referring to FIG. 6, a flow chart illustrating the flow of control data is transferred from the process data control system 20 by the communication builder 30 to the equipment interface system 14 is shown. In a step 602, the communication builder 30 receives control data in the open format from the process data control system 20. In a step 604, the communication builder 30 configures the control data from the open format to the equipment interface system data format, and in a step 606, transmits the configured control data to the equipment interface system 14.

Figure 7:
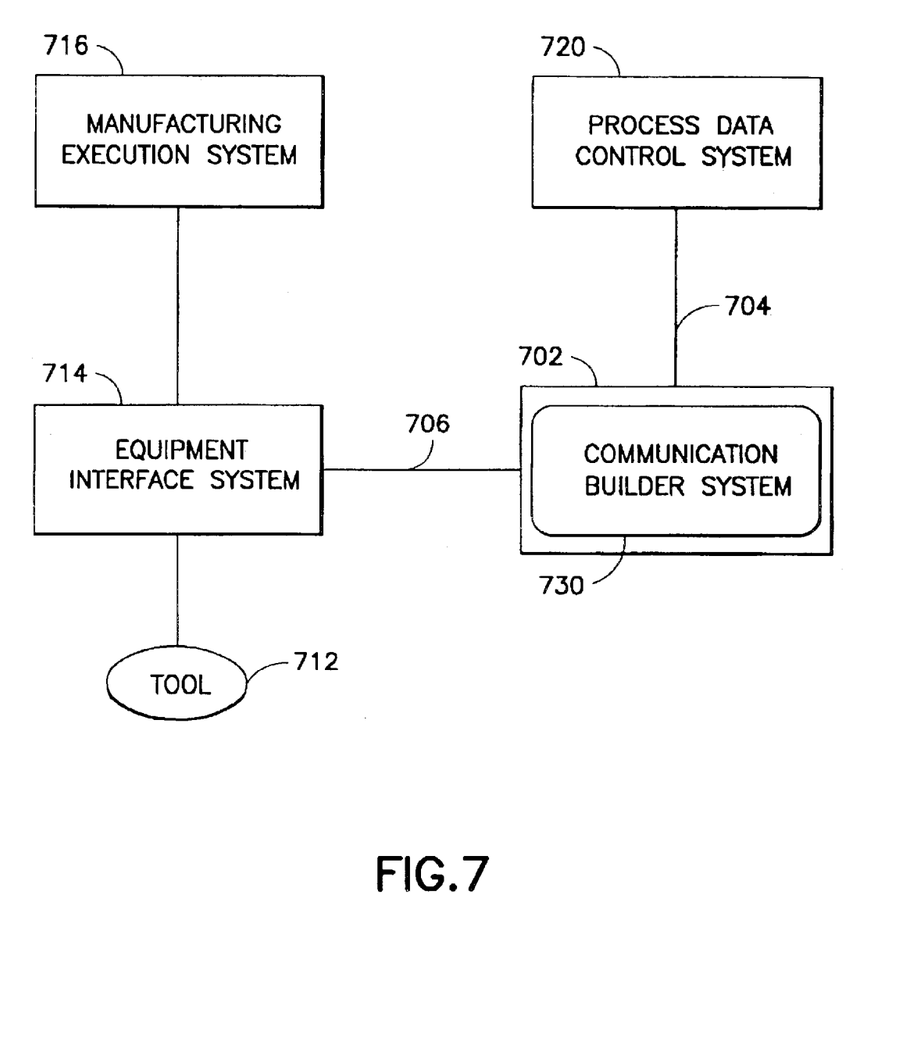
FIG. 7 is a block diagram of a process control system implementing an alternative embodiment of a communication builder system incorporating features of the present invention.

FIG. 7 shows an alternate embodiment of a system 700 in which the present invention can be used including a communication builder system 730 located on a separate computer system 702 from an equipment interface system 714. The equipment interface system 714 is also in communication with a manufacturing execution system 716. In addition, the communication builder system 730 is functioning only in a data collection mode and is connected to a process data control system 720 by only one communication line 704. Further, the process data control system 720 is not providing process control data to the equipment interface system 714. Therefore, only one communication line 706 is located between the communication builder system 730 and the equipment interface system 714.

Figure 8:
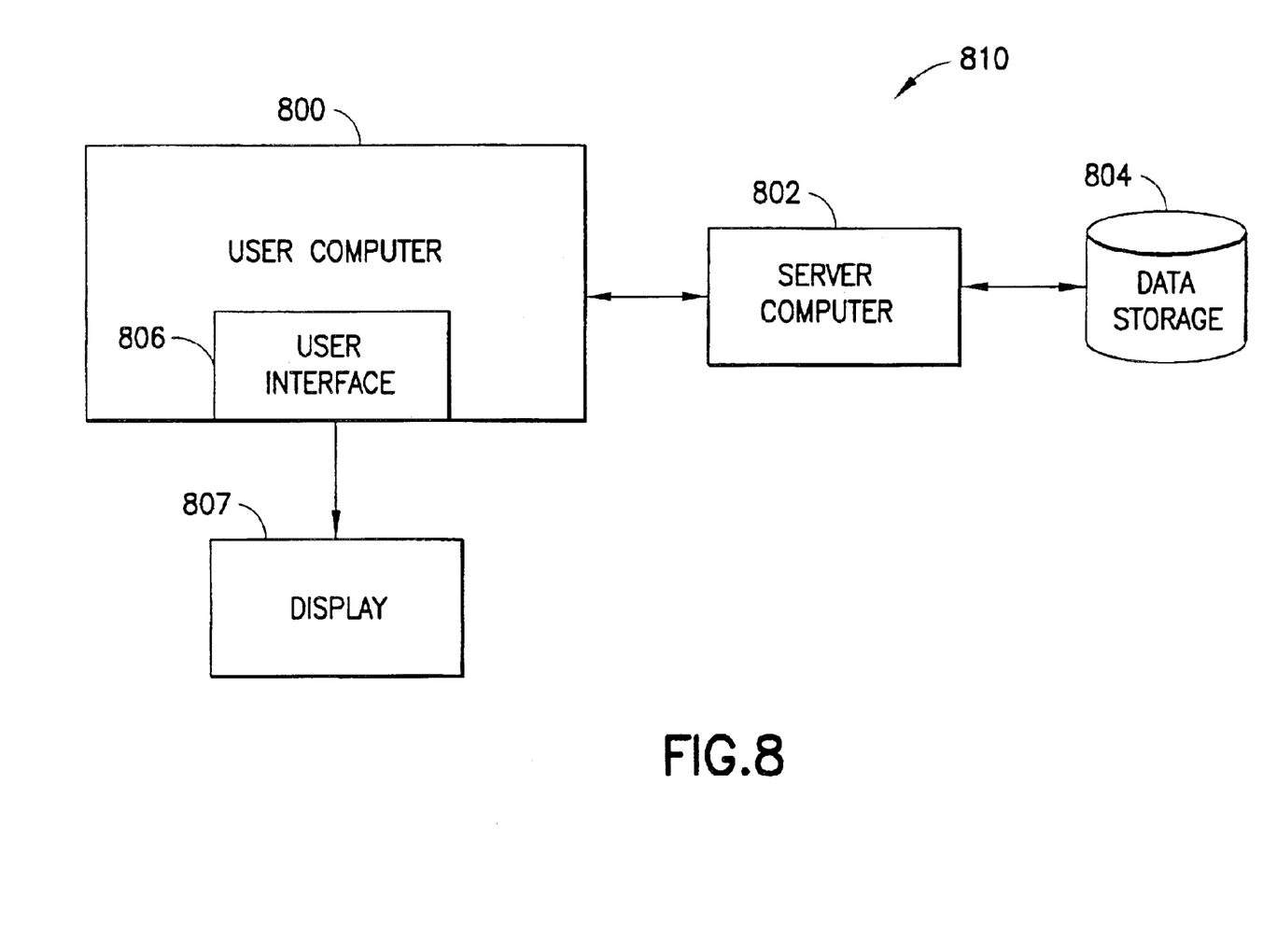
FIG. 8 is a block diagram of a typical architecture that can be used to practice the present invention.

The present invention may include software and computer programs incorporating the process steps and instructions described above that are executed in separate computers. As shown in FIG. 8, a computer system 800 may be linked to another computer system 802, such that the computers 800 and 802 are capable of sending information to each other and receiving information from each other. In one embodiment, a computer system 810 could include a server computer adapted to communicate with a network, such as for example, the Internet. Computer systems 800 and 802 can be linked together in any conventional manner including a modem, hard wire connection, or fiber optic link.

Generally, information can be made available to both computer systems 800 and 802 using a communication protocol typically sent over a communication channel such as the Internet, or through a dial-up connection on ISDN line. Computers 800 and 802 are generally adapted to utilize program storage devices embodying machine readable program source code which is adapted to cause the computers 800 and 802 to perform the method steps of the present invention.

The program storage devices incorporating features of the present invention may be devised, made and used as a component of a machine utilizing optics, magnetic properties and/or electronics to perform the procedures and methods of the present invention. In alternate embodiments, program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 800 and 802 may also include a microprocessor for executing stored programs. Computer 800 may include a data storage device 804 on its program storage device for the storage of information and data. The computer program or software incorporating the processes and method steps incorporating features of the present invention may be stored in one or more computers 800 and 802 on an otherwise conventional program storage device. In one embodiment, computers 800 and 802 may include a user interface 806 from which features of the present invention can be accessed. The user interface and the display interface can be adapted to allow the input of queries and commands to the system 30, as well as present the results of the commands and queries. The computers 800 and 802 may include a display device 807, such as a printer or display screen, for displaying output from the computer, such as reports.

It should be understood that the foregoing description is only illustrative of the invention. Various alternatives and modifications can be devised by those skilled in the art without departing from the invention. For example, while a communication builder system in communication with a process data control system has been shown and described, the present invention is not so limited, as any system for receiving process data from an equipment interface system may use the communication builder system as an interface.

Furthermore, while functions have been associated with particular modules, such as a communication manager, the present invention is not so limited, as other groupings of the disclosed functions may be used without departing from the broader aspects of the present invention. Accordingly, the present invention is intended to embrace all such alternatives, modifications and variances which fall within the scope of the appended claims.

What is claimed is:

1. A method for communicating process data between a plurality of devices in a process control system, the method comprising the steps of:

receiving process data in an equipment interface system data format from an equipment interface system;

allowing a user to select a set of the process data for communication to a process data control system;

mapping the selected set of process data to predefined variables for storing in a configuration database;

configuring the selected set of process data from the equipment interface system data format into an open format for communication to the process data control system without configuring the process data that was not selected; and transmitting the configured process data to the process data control system.

2. The method of claim 1, further including the steps of:

receiving control data in the open format from the process data control system for providing feedback to the equipment interface system;

configuring the control data from the open format into the equipment interface system data format; and transmitting the configured control data to the equipment interface system.

3. The method of claim 2, wherein in the step of receiving the control data, the control data is fault data.

4. The method of claim 2, wherein in the step of receiving the control data, the control data is process adjustment data.

5. The method of claim 1, wherein the step of selecting a set of process data further includes defining a plurality of sets of process data for the equipment interface system.

6. The method of claim 1, wherein in the step of configuring, the data into the open format, the open format is eXtensible Markup Language.

7. The method of claim 1, further including the step of determining statistics based upon the process data received from the equipment interface system.

8. A communication builder device for communicating process data between a plurality of devices in a process control system, comprising:

a communication manager adapted to format process data received from an equipment interface system into a format suitable for the communication builder;

a data explorer for allowing a user to select a predefined set of the communication builder data format process data and to map the selected data to predefined variables for storing in a configuration database, wherein the data explorer operates to report the selected data to a process data control system;

wherein the communication manager is further adapted to configure the selected set of process data into an open data format for communication to the process data control system without configuring the process data that was not selected, and is adapted to transmit the configured process data to the process data control system; and a data administrator for providing monitoring and management of the communication manager.

9. The system of claim 8, wherein the communication manager is further adapted to receive control data in the open format from the process data control system for providing feedback to the equipment interface system;

wherein the communication builder system further comprises a run control manager for configuring the control data from the open format into the equipment interface system data format; and wherein the communication manager is further adapted to transmit the configured control data to the equipment interface system.

10. The system of claim 9, wherein the control data is fault data.

11. The system of claim 9, wherein the control data is process adjustment data.

12. The system of claim 8, wherein the data explorer is further adapted to define a plurality of sets of process data for the equipment interface system.

13. The system of claim 8, wherein the open data format is eXtensible Markup Language.

14. A computer program product comprising:

a computer usable medium having computer readable code means embodied therein for causing a computer to communicate process data between a plurality of devices in a process control system, the computer readable code means in the computer program product comprising:

computer readable program code means for causing a computer to receive process data in an equipment interface system data format from an equipment interface system;

computer readable program code means for causing a computer to allow a user to select a set of the process data for communication to a process data Control system;

computer readable program code means for causing a computer to map the selected set of process data to predefined variables for storing in a configuration database;

computer readable program code means for causing a computer to configure the selected set of process data from the equipment interface system data format into an open format communication to the process data control system without configuring the process data that was not selected; and computer readable program code means for causing a computer to transmit the configured data to the process data control system.

15. The computer program product of claim 14, further including:

computer readable program code means for causing a computer to receive control data in the open format from the process data control system for providing feedback to the equipment interface system;

computer readable program code means for causing a computer to configure the control data from the open format into the equipment interface system data format; and computer readable program code means for causing a computer to transmit the configured control data to the equipment interface system.

16. The computer program product of claim 15, wherein the control data is fault data.

17. The computer program product of claim 15, wherein the control data is process adjustment data.

18. The computer program product of claim 14, further including computer readable program code means for causing a computer to define a plurality of sets of process data for receiving from the equipment interface system.

19. The computer program product of claim 14, wherein the open data format is eXtensible Markup Language.

20. The computer program product of claim 14, further including computer readable program code means for determining statistics based upon the process data received from the equipment interface system.

21. A semiconductor fabrication and manufacturing process control system comprising:

a process data control device adapted to provide process monitoring and process analysis of process data received from at least one manufacturing tool, and adapted to provide control instructions to the at least one manufacturing tool;

an equipment interface device adapted to receive data from and provide control to the at least one associated manufacturing tool based on control instructions received from the process data control device; and a communication builder device adapted to interface between and facilitate a communication at information and data between the process control device and the equipment interface device, the communication builder device being adapted to:

receive process data in an equipment interface system data format from the equipment interface system, allow a user to select a set of the process data received from the equipment interface system for communication to the process data control system, map the selected set of process data to predefined variables for storing in a configuration database;

configure the selected set of process data from the equipment interface system data format into an open format for communication to the process data control system without configuring the process data that was not selected, and transmit the configured process data to the process data control system.

* * * * *

UNITED STATES PATENT AND TRADEMARK OFFICE
CERTIFICATE OF CORRECTION

PATENT NO. : 6,842,660 B2
DATED : January 11, 2005
INVENTOR(S) : Tripathi et al.

It is certified that error appears in the above-identified patent and that said Letters Patent is hereby corrected as shown below:

Column 12,
Line 37, between "format" and "communication" please insert -- for --

Column 13,
Line 17, please replace "at" with -- of --

Signed and Sealed this

Twenty-first Day of June, 2005

JON W. DUDAS
*Director of the United States Patent and Trademark Office*